(12) United States Patent
Tan et al.

(10) Patent No.: US 8,941,752 B2
(45) Date of Patent: Jan. 27, 2015

(54) DETERMINING A LOCATION USING AN IMAGE

(75) Inventors: Wai-Tian Tan, Sunnyvale, CA (US); John Apostolopoulos, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 11 days.

(21) Appl. No.: 13/459,961

(22) Filed: Apr. 30, 2012

(65) Prior Publication Data

US 2013/0286238 A1 Oct. 31, 2013

(51) Int. Cl.
*H04N 5/228* (2006.01)
*H04N 5/232* (2006.01)
*H04N 5/225* (2006.01)

(52) U.S. Cl.
USPC .................. 348/222.1; 348/211.1; 348/211.2; 348/211.3; 348/207.1

(58) Field of Classification Search
USPC ........ 348/211.99, 211.1, 211.2, 211.3, 207.1; 725/105
See application file for complete search history.

(56) References Cited

U.S. PATENT DOCUMENTS

| 2004/0183918 | A1* | 9/2004 | Squilla et al. | 348/211.2 |
|---|---|---|---|---|
| 2010/0250136 | A1* | 9/2010 | Chen | 701/300 |
| 2012/0327252 | A1* | 12/2012 | Nichols et al. | 348/207.1 |
| 2012/0330601 | A1* | 12/2012 | Soubra et al. | 702/150 |

OTHER PUBLICATIONS

Horswill, Ian, Polly: A vision-based artificial agent, 1993 Proceedings of the Eleventh National Conference on Artificial Intelligence (AAAI-93), 6 pgs.
Park, S.Y., et al., Mobile robot localization in indoor environment using scale-invariant visual landmarks,in Proc. IAPR Workshop Cognitive Inform. Process., Jun. 2008, pp. 159-163.
Schroth, G., et al., Exploiting prior knowledge in mobile visual location recognition, IEEE International Conference on Acoustics, Speech and Signal Processing (ICASSP 2012), Kyoto, Japan, Mar. 25-30, 2012, 4 pgs.
Sivic, J., et al., Video Google: A text retrieval approach to object matching in videos, in Proc. ICCV, 2003, 8 pgs.
Zhang, J., et al., Location-based image retrieval for urban environments, ICIP 2011, Brussels, Belgium, Sep. 11-14, 2011, 4 pgs.

* cited by examiner

*Primary Examiner* — Twyler Haskins
*Assistant Examiner* — Padma Haliyur
(74) *Attorney, Agent, or Firm* — Wagner Blecher LLP; John P. Wagner, Jr.

(57) ABSTRACT

Determining a location. An initial image is captured at an image capturing device. The initial image is compared with images in a database of images which have associated locations to determine the location of the image capturing device. A user receives a notification if a location cannot be determined.

18 Claims, 8 Drawing Sheets

DETERMINING A LOCATION USING AN IMAGE

BACKGROUND

Mobile devices, such as smart phones or tablets, are becoming increasingly available to the public. Mobile devices comprise numerous computing functionalities, such as email readers, web browsers, and media players. Many mobile devices allow users to determine their location by employing global positioning systems. However, global positioning systems have limitations.

BRIEF DESCRIPTION OF THE DRAWINGS

The accompanying drawings, which are incorporated in and form a part of this specification, illustrate and serve to explain the principles of embodiments in conjunction with the description. Unless specifically noted, the drawings referred to in this description should be understood as not being drawn to scale.

DESCRIPTION OF EMBODIMENTS

Figure 1:
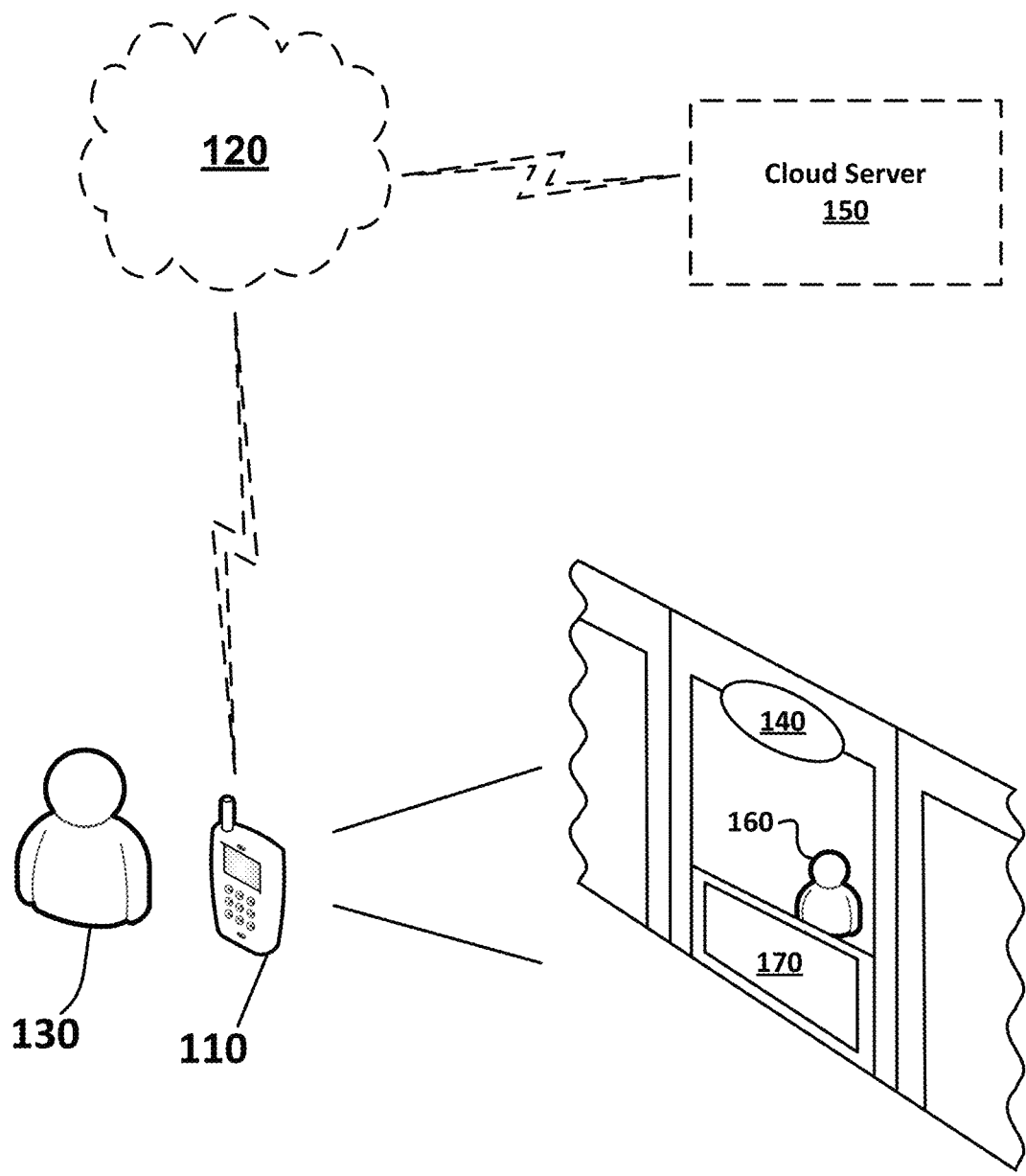
FIG. 1 shows an example system upon which embodiments of the present invention may be implemented.

Reference will now be made in detail to various embodiments, examples of which are illustrated in the accompanying drawings. While the subject matter will be described in conjunction with these embodiments, it will be understood that they are not intended to limit the subject matter to these embodiments. Furthermore, in the following description, numerous specific details are set forth to provide a thorough understanding of the subject matter. In other instances, known methods, procedures, objects, and circuits have not been described in detail as not to unnecessarily obscure aspects of the subject matter.

Notation and Nomenclature

Some portions of the description of embodiments which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of an electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present discussions terms such as "capturing", "uploading", "receiving", "determining", "providing", "comparing", "sending", "downloading" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, in some embodiments, methods described herein can be carried out by a computer-usable storage medium having instructions embodied therein that when executed cause a computer system to perform the methods described herein.

Overview of Discussion

Example techniques, devices, systems, and methods for determining a location with an image described herein. Discussion begins with an example image capturing device. Discussion continues with examples of image comparison techniques. Next, example user feedback techniques are described. Discussion continues with examples of updating an image database. Next, three methods of use are described. Lastly, an example electronic environment is discussed.

Example Image Capturing

FIG. 1 shows user 130 using an image capturing device 110 to capture an image of a location 140. In some embodiments, image capturing device 110 may compress an image. It should be understood that while the example location 140 in FIG. 1 shows a store front, location 140 could be any location including, but not limited to: the interior of a building, the exterior of a building, a landscape, a cityscape, etc. Further, image capturing device 110 may be any type of electronic device including, but not limited to: a smart phone, a personal digital assistant, a tablet computer, a laptop computer, a digital video recorder, etc. In one embodiment image capturing device 110 may capture video from which individual images may be extracted.

In some embodiments, image capturing device 110 may determine an approximate location prior to capturing an image. User 130 may use the approximate location to assist with finding the exact location 140 user 130 is looking for. Although not as exact as location 140, an approximate location may assist user 130 with determining whether he is close to his desired location 140. In one embodiment, the approximate location may be used to determine whether image capturing device 110 is within a particular building. As examples, determining an approximate location may be performed using techniques including, but not limited to: a global positioning system, wireless (wi-fi) inferment, beacon schemes, triangulation, etc.

In one embodiment text captured by image capturing device 110 may be deciphered to determine an approximate location. For example, if user 130 is in Japan and does not know the name of the particular shopping mall he is about to enter, nor is he able to read the signs, he may capture an image of a sign which may be used to determine his approximate location. In other embodiments a user 130 may manually enter an approximate location into image capturing device 110. For example, a user may enter an address or the name of an office building or shopping complex into image capturing device 110. In some embodiments image capturing device 110 allows user 130 to pull up a map of the approximate, or local location they are determined to be at to further approximate where they are.

In some embodiments, the image capturing device 110 automatically recognizes the approximate location it is at (e.g., a business complex, a mall, a large park), and downloads a database of images of the particular approximate location. For example, in some embodiments a building may comprise a transmitter and/or receiver which recognizes when an image capturing device 110 enters the building, and automatically transmits a database of images and locations 140 to image capturing device 110. In other embodiments, a transmitter may prompt image capturing device 110 to download a map of the building, park, or approximate location from the transmitter/cloud server 150. For the purposes of this disclosure, the transmitters described herein are synonymous with cloud server 150, as will be discussed below. In one embodiment, user 130 may buy a map and download/load it onto image capturing device 110. In the case where a the image capturing device does not communicate with a cloud server 150, loading a database of images onto the image capturing device 110 allows a user 130 to use image capturing device 110 without access to cloud server 150. In some embodiments image capturing device 110 contains its own database of images or features of images. As another example, a user 130 may insert a digital video disk (DVD), memory card, or the like and load map information directly onto image capturing device 110.

For the purposes of this disclosure, it should be appreciated that the term database may include an image matching system, a database of features of images, or the like. For instance, some image matching systems store salient computed features such as types of scale-invariant features, or other quantized/clustered versions of features. As discussed elsewhere in this disclosure, comparing an image to a database of images may include, but is not limited to: comparing an image to images within a database, comparing an image to images using an image matching system which does not store physical images in a database, comparing an image to salient computed features using various operations and procedures, generally comparing an image, or features thereof, to a database of features of images, etc.

Location 140 of FIG. 1 further includes an excludable region 170, and an excludable person 160. In some embodiments, after images are captured, excludable region 170 and excludable person 160 may be excluded from any type of image comparison since they may not help with determining a location. Excludable region 170 and excludable person 160 are discussed in further detail below.

In some embodiments, after acquiring an image, image capturing device 110 uploads the image, or features of the image, through network 120 to cloud server 150. For the purposes of the disclosure, cloud server 150 is meant to be broad and may refer many types of hardware, software or firmware including, but not limited to: a remote location determining service, a single remote computer, multiple remote computers, a distributed collection of computers, database servers, distributed databases including flat-file, relational and graph databases, web servers, application servers, groupware servers, proxy servers, audio/video servers, FTP servers, real-time communication servers, telnet servers, open source servers, virtual servers, etc. It should be appreciated that software and firmware are machine readable instructions.

For the purpose of brevity, the terms "image" and "features of an image," or the like, are meant to be synonymous and are used interchangeably within this disclosure. It should be appreciated that for the purposes of the instant disclosure, in some embodiments an image captured by image capturing device 110 may be transformed. For instance, an image may be reduced to features of an image by, for example, being compressed or pixelated. In some embodiments, only features of an image may be sent to a database of features of images for comparison. This practice of comparing features of images rather than entire images is common to reduce latency when performing image comparisons because fewer bits are required for a comparison. Note that although at points throughout the instant disclosure, the phrase "image, or features of the image" is used, the two are nevertheless interchangeable.

Example Image Comparison

After an image is captured, the image or features of the image may be compared to other images located in a database. As described above, a database may contain features of images, or employ an image matching system. It should be appreciated that this description of a database, and the description above, applies to the references to a database elsewhere in this disclosure. In one embodiment each image in the database has an associated location 140. In some embodiments, this database of images is located in a cloud server 150 and downloaded to image capturing device 110. In other embodiments, image capturing device 110 may comprise a database of images. As an example, when someone enters a large office complex or mall, an employee or machine may provide them with an image capturing device 110 to assist with navigation. In another example, as discussed herein, a collection of images may be downloaded by image capturing device 110 when image capturing device 110 enters a particular area. In one embodiment, image capturing device 110 may access a particular Internet address or navigation portal to download images.

In one embodiment a captured image, or features thereof, may be compared to other images, or features thereof, on the image capturing device 110, or at a remote location such as cloud server 150. Images may be compared using a number of techniques known in the art, including, but not limited to: normalized cross correlation, keypoint matching, comparing Euclidean or Manhattan distances, histogram comparisons, edge detection, correlations of RGB values, transformations, side-by-side displays, Hausdorff-based image comparisons, fingerprinting, scale-invariant features, watermarking, alternate display with or without an intervening blank image, bags-of-feature techniques, etc.

In one embodiment, particular immobile regions of images are presumed to be more reliable when compared in a database as opposed to mobile regions of images. For example, a ceiling, windows, doors, or floor patterns may be given more weight, or presumed to be more reliable, during a comparison than a table or billboard.

Figure 2:
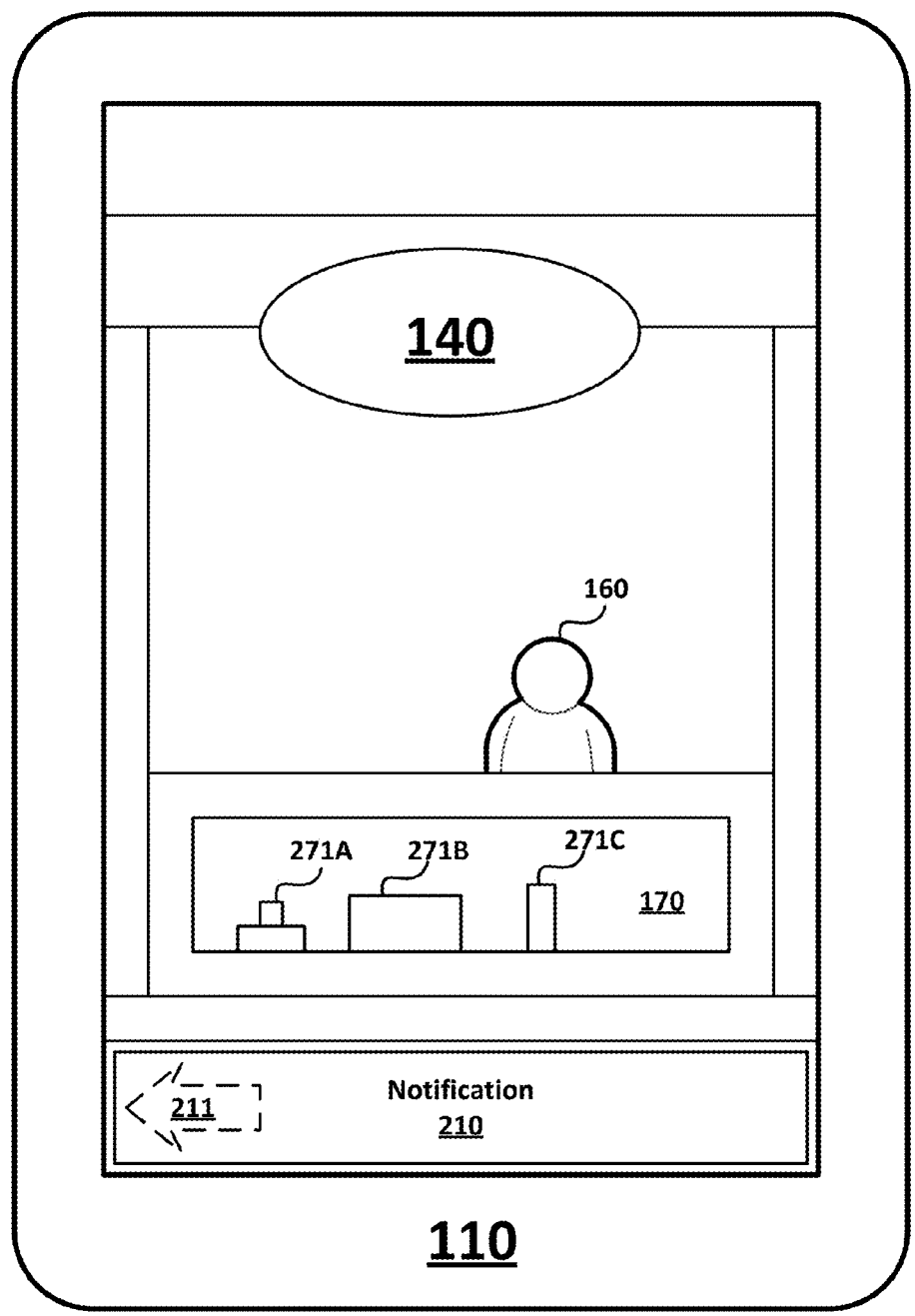
FIG. 2 shows an example of a device capturing an image in accordance with embodiments of the present invention.

In FIG. 2, excludable region 170 is shown. In some embodiments, pre-processing may be performed to remove excludable regions 170 such that the excludable regions 170 are not compared during an image comparison. As an example, excludable regions 170 may contain products 271A, 271B, and 271C. Since products 271 may change daily, weekly or seasonally, excludable regions 170 may not be useful for comparing images. Similarly, a white board in an office building, or a billboard in an outdoor area may be considered an excludable region 170 in some embodiments. In some embodiments, image capturing device 110 and/or the image database may be designed such that excludable person 160 is excluded from an image comparison. In one embodiment, if user 130 is capturing an image outdoors, image capturing device 110 and/or the image database may remove background images such as clouds or image data beyond a skyline. In some embodiments, captured images of skylines may be matched to images of skylines in a database using the techniques described herein.

Example User Feedback

In some embodiments, user 130 may register or create an account to use a location determination system. For example, a user 130 may purchase a subscription, or pay a one-time payment such that user 130 may access a database of images whether the database is located on a cloud server 150 or elsewhere. In other embodiments access is free, and a user does not have to register.

After user 130 provides an image to a database for comparison, image capturing device 110 receives feedback to provide to user 130. In some embodiments notification 210 will provide the location 140 of image capturing device 110. For example, a location 140 may be shown by placing a dot on the screen of image capturing device 110. In some embodiments, notification 210 will provide a probability, or a measure of confidence, that image capturing device 110 is at location 140.

In some embodiments notification 210 will advise user 130 to capture another image or video to refine the possible location. In some embodiments, image capturing device 110 may employ augmented reality and notification 210 will overlay an image on the screen of image capturing device 110. In one example image capturing device 110 may be a pair of glasses that user 130 wears. In this example, glasses may provide notifications 210 and transparent or semi-transparent overlays. In this example a user 130 may look around and a location 140 will be transmitted to image capturing device 110.

In one embodiment, a location 140 may be determined from a single image. When a location 140 cannot be determined from at least one image, image capturing device 110 may display a notification 210 which comprises information to narrow a set of possible locations. In some embodiments this notification 210 is computed by a cloud server 150, while in other embodiments this notification 210 is computed by image capturing device 110. In some examples, notification 210 may instruct user 130 to record video or capture an image in a particular direction. In some examples, notification 210 may instruct user 130 to move in a particular location and record video or capture an image. For example, notification 210 may instruct user 130 to move 10 feet to the west and capture another image in a particular direction.

In one example, notification 210 may comprise an arrow 211 which indicates that if user 130 captures another image to the right, left, up or down (or a combination thereof), there will be a greater chance that location 140 will be determined. Notification 210 may indicate how far to the particular direction user 130 should pivot to capture another image in degrees, for example. In one embodiment notification 210 may indicate how far and in what direction user 130 should move to capture an image which will likely produce the exact location 140 where image capturing device 110 is located.

In another example, notification 210 may comprise a list of possible locations where image capturing device 110 may be located. In one embodiment the list of possible locations is selectable. That is, user 130 may choose an approximate location or an exact location 140 from a selectable list of possible locations. User 130 may then be instructed, based in part on the map selected, to capture additional images to determine the exact location 140 of image capturing device 110. In one example, user 130 may select a possible location to confirm that location 140 is correct.

In some embodiments, in addition to a list of possible locations, notification 210 may advise user 130 of a direction in which to capture additional images. Notification 210 may advise user 130 of the degrees or distance in which to turn a particular direction. In one example, after a list of possible locations is displayed, user 130 may be advised to capture additional images while moving in a particular direction indicated by a map displayed on image capturing device 110. In some embodiments a user 130 may need to intentionally capture an additional image, while in other embodiments image capturing device 110 may capture additional images automatically.

In one embodiment, after image comparison is performed a subset of images with associated locations 140 is created which reduces the pool of locations 140 where image capturing device 110 may be located. Notification 210 may be based in part on this subset of images. For example, if the image is determined to be a Starbucks™ in a mall, a subset of images containing Starbucks™ in malls may be created to make the notification 210 more useful. With this subset, the database may compute that, for example, 1% of the Starbucks™ in that approximate location are immediately to the left of a Burger King™, thus narrowing the subset of possible locations. In that example situation, notification 210 may advise user 130 to capture an image on the right side of the Starbucks™. As another example, in that situation notification 210 may prompt user 130 to answer whether the Starbucks™ is to the left of a Burger King™.

In another example, image capturing device 110 may capture an image of the largest atrium in Japan. Although the exact location 140 may not be determined from this image, a subset of images and associated locations may be determined to assist user 130 or the application determining location 140 in narrowing the number of possible locations image capturing device 110 may be. While these are meant to be examples, it should be understood that calculations such as these may be employed by a database or application to create more effective notifications 210.

In some embodiments, user 130 may enter a desired location. As an example, after location 140 is determined, directions to a desired location may be calculated and displayed on image capturing device 110. In one embodiment, although an exact location 140 has not yet been determined, image capturing device 110 may capture images while user 130 moves and provide feedback information incrementally or in a continuous stream.

Example Image Database Updating

In some embodiments, a database of images is located in image capturing device 110. In others, a database is located in cloud server 150. In either case, the database may be updated wirelessly or otherwise. Updating the database of images with associated locations is advantageous because frequently the interiors of buildings or various outdoor locations 140 may change. For example, a poster may be on a particular wall of an office building for years, and moved to another wall one day. By updating the database incorrect location determinations may be avoided.

In some embodiments, an image database is updated every time an image is sent to cloud server 150. In other embodiments, only a portion of the images sent to a database for comparison are used to update the database. In one embodiment, images captured more recently are presumed to be more reliable when searching a database than images that were captured less recently. For example, an image of a scene captured in 2012 may be assumed to be more reliable than an image of the same scene captured in 2011. In some embodiments, when a building or cubicle is removed from a scene/location 140, a database is updated to reflect the missing object. In some embodiments, newly submitted images indicating discrepancies with existing database are put on a probation list until those discrepancies can be verified. For example, this avoids a janitor's cart from being mis-represented as a permanent change in the environment.

In some embodiments, a verification process may take place, either in the cloud server 150 or otherwise, to ensure that a particular image is of a particular location 140. After it is verified, the image is compared to a database to determine whether the database could be updated. In some embodiments, the images are time stamped such that if a particular amount of time has passed since the last update (e.g., a week, month, year, etc.) the older image will be replaced with the image captured more recently. In one embodiment, if a new machine is installed in a warehouse, a new store is placed in a mall, or a new sign in placed in front of a building, a database needs to be updated to determine the location 140. In some embodiments, a database is updated every time an image is sent to the database for comparison. In other cases, a database is updated by an employee or agent of the building or complex. In one example, the database is updated when the comparison system determines the location 140 of the image, while at the same time determining something is missing or new in the image. In some embodiments, older images within a database may be removed to make room for new images.

In some embodiments, it is determined whether the image contains an excludable region 170 and whether that excludable region 170 should remain an excludable region 170 or become a permanent/comparable region. While excludable regions 170 are typically not compared when determining a location 140 because they may change frequently, a permanent, or comparable, region is relatively static and is used when comparing an image to a database of images to determine a location 140. In one embodiment, if an image is determined not to have changes outside an excludable area 170 the database may be updated with the verified image.

As an example, if a whiteboard was an excludable region 170, and the white board is replaced with a piece of art, a database may be updated such that the excludable region 170 where the whiteboard was located is now a region that will be analyzed/compared when identifying a location with an image capturing device 110. To determine whether the excludable area 170 is no longer an excludable area 170 a system to update excludable areas 170 my use techniques including, but not limited to: the history of the excludable area 170 where it can be declared non-excludable only if there are no changes in the area over a particular period of time, analyzing the content of excludable area 170 (e.g., if a construction area in a mall is replaced with an escalator or some other relatively permanent structure), and analyzing images to determine whether an image of an excludable area 170 is obstructed by an excludable person, cart, or the like. In some embodiments these methods may be used to determine whether a location 140 or image in a database needs updating. In some embodiments these methods may be performed by cloud server 150.

In some embodiments, an image database is pre-loaded with images. For example, images of an entire mall may be captured to populate a database with images. This may be performed by mall employees, a paid contractor, a robot, or an agent of the company that sells the image capturing device 110. In some embodiments, a notifier recommends updating a database based in part on the type of location 140 needing updating and the length of time since the previous update. In some embodiments, updating the database is not performed by image capturing device 110. Updating a database may be performed by a different type of image or video capturing device including, but not limited to: a video camera, a closed circuit video system, a digital camera, a smart phone, etc.

In some embodiments users 130 may tag, or label images they capture to update a database. In this way, crowdsourcing is used to create and update databases. In some embodiments there may be a fail-safe system to ensure users 130 are not incorrectly tagging images. For example, if 90% of users 130 tag an image of a Macy's™ as a Macy's™, and 1% of users 130 tag an image of the Macy's™ as a Nordstrom™, a fail-safe system may presume that the image tagged as a Nordstrom™ was tagged incorrectly and disregard it. In some embodiments, a combination of employing professionals and crowdsourcing may be used to maintain a database.

Example Methods of Use

The following discussion sets forth in detail the operation of some example methods of operation of embodiments. FIGS. 3, 4, 5, 6 and 7 illustrate example procedures used by various embodiments. Flow diagrams 300, 400, 500, 600 and 700 include some procedures that, in various embodiments, are carried out by the electronic devices illustrated in FIG. 1, FIG. 2, FIG. 8, or a processor under the control of computer-readable and computer-executable instructions. In this fashion, procedures described herein and in conjunction with flow diagrams 300, 400, 500, 600 and 700 are or may be implemented using a computer, in various embodiments. The computer-readable and computer-executable instructions can reside in any tangible computer readable storage media, such as, for example, in data storage features such as computer usable volatile memory 808, ROM 810, and/or data storage unit 812 (all of FIG. 8). The computer-readable and computer-executable instructions, which reside on tangible computer readable storage media, are used to control or operate in conjunction with, for example, one or some combination of processor 806A, or other similar processor(s) 806B and 806C. Although specific procedures are disclosed in flow diagrams 300, 400, 500, 600 and 700, such procedures are examples. That is, embodiments are well suited to performing various other procedures or variations of the procedures recited in flow diagrams 300, 400, 500, 600 and 700. Likewise, in some embodiments, the procedures in flow diagrams 300, 400, 500, 600 and 700 may be performed in an order different than presented and/or not all of the procedures described in these flow diagrams may be performed, and/or additional operations may be added. It is further appreciated that procedures described in flow diagrams 300, 400, 500, 600 and 700 may be implemented in hardware, or a combination of hardware, with either or both of firmware and software (where firmware and software are machine readable instructions).

Figure 3:
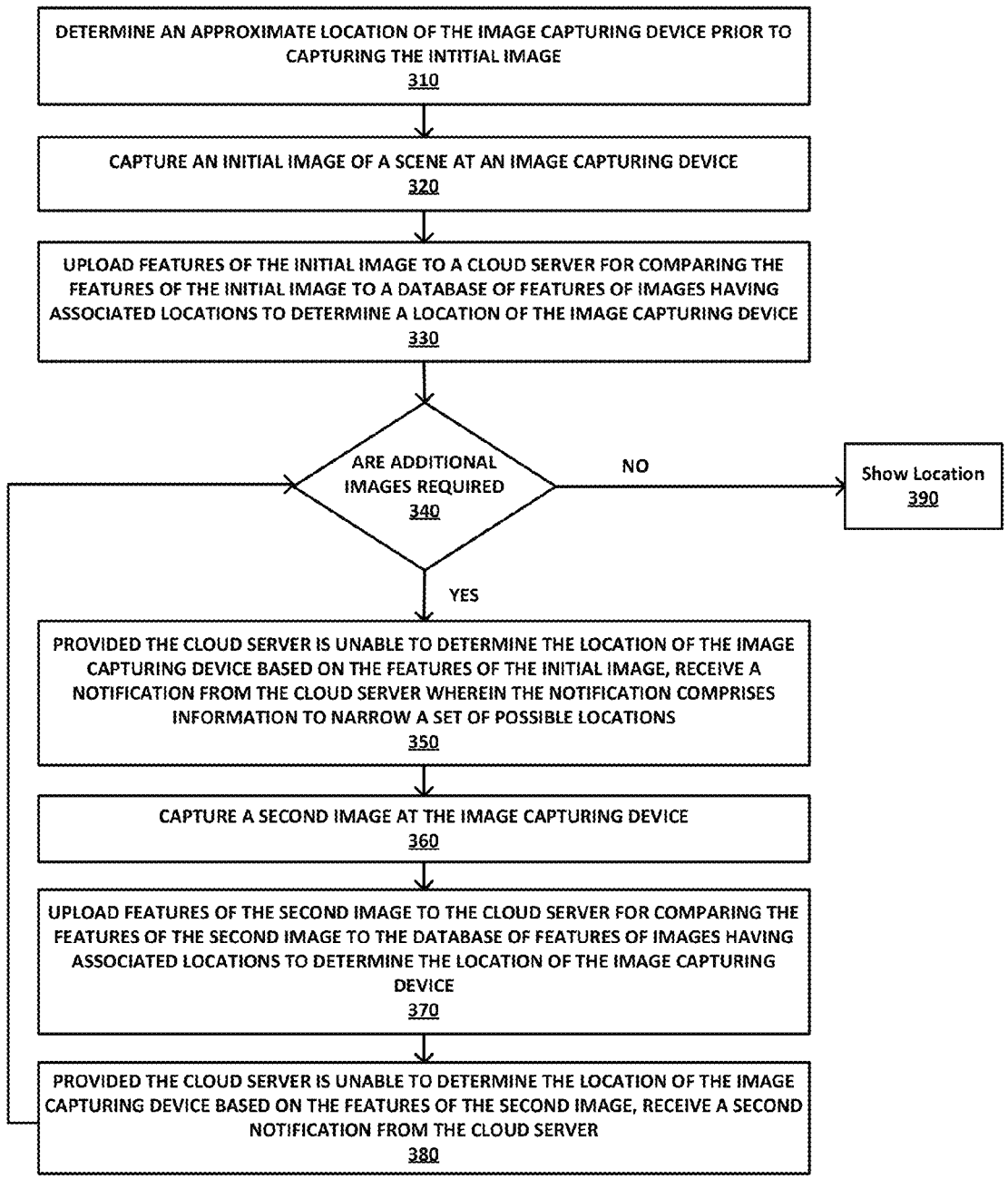
FIG. 3 is example flowchart for determining a location with an image capturing device in accordance with embodiments of the present invention.

FIG. 3 is a flow diagram 300 of an example method for determining a location with an image capturing device.

In operation 310, in one example, an approximate location of the image capturing device 110 is determined prior to capturing the initial image. By determining an approximate location prior to capturing an image, the number of images to compare to the captured image may become much smaller, thereby reducing latency. An approximate location may be determined using a global positioning system, triangulation, wi-fi inferment, etc.

In operation 320 an initial image of a scene is captured with an image capturing device 110. In some examples the scene may be the interior of a building, in others it may be an exterior of a building or a landscape. In some examples image capturing device 110 captures video and extracts images from the video, in other examples image capturing device 110 captures still images.

In operation 330, in one example, the initial image, or some of its features, is uploaded to a cloud server 150 for comparing the initial image to a database of images having associated locations 140 to determine a location 140 of the image capturing device 110. For the purposes of this disclosure comparing an image to a database of images is synonymous with comparing an image to images located within a database of images. In some examples, cloud server 150 comprises images where each image has a location 140 associated with it. When the initial image is uploaded, it is compared to the images in the database to determine whether it matches an image in the database. If it matches, in some embodiments, a notification 210 is sent to image capturing device 110 to indicate to user 130 that they are at the particular location 140 associated with the image stored in the database. In some examples, only portions of the image are compared to portions of images stored in the database of images.

In operation 340, in one example, image capturing device 110 indicates whether additional images are needed to determine the location 140. If additional images are needed, user 130 may gather additional images using image capturing device 110. For example, if a notification 210 advises user 130 that additional images are needed, user 130 may capture additional images of his surrounding to determine the location 140 of image capturing device 110.

In operation 350, in one example, provided that cloud server 150 is unable to determine the location 140 of the image capturing device 110 based on the initial image, a notification 210 is received from cloud server 150 wherein the notification 210 comprises information to narrow a set of possible locations where image capturing device 110 could be located. For example, an initial image or even a second image may not match an image in the database of images. In that situation cloud server 150 may send a notification 210 to image capturing device 110 to indicate to user 130 that image capturing device 110 is in one of a subset of locations 140. This subset may be large or small, and may include the names of specific locations or geographic coordinates. In some embodiments, the notification 210 may take the form of a map overlay, a split screen display, augmented reality, or sound.

In operation 360, in one example, a second image is captured at the image capturing device 110. The image capturing device 110 may capture the image automatically, or prompt user 130 to capture a second image. In some embodiments if a second image is required image capturing device 110 will begin recording video automatically and begin uploading images extracted from the video to cloud server 150 to determine the location of image capturing device 110.

In operation 370, in one example, a second image, or features of the second image, is uploaded to cloud server 150 for comparing a second image to the database of images having associated locations 140 to determine the location 140 of the image capturing device 110. If a location 140 cannot be determined by an initial, or first image, a second image is captured to assist image capturing device 110 determine its location 140. In some embodiments, a comparison between an initial image and an image in a database may provide an approximate match (e.g., a notification 210 may display that there is a 60% chance that user 130 is in a particular location). In that situation a second image may increase or decrease the probability that the approximate match is the correct location 140. In some embodiments, a notification 210 may advise user 130 of a direction in which to capture a second image.

In operation 380, in one example, provided the cloud server 150 is unable to determine the location of the image capturing device 110 based on the second image, a second notification 210 is received from cloud server 150. If after comparison, a location 140 still cannot be determined, another notification 210 is sent to image capturing device 110. In some embodiments the second notification 210 may advise user 130 on a direction in which to capture another image, or it may comprise directions on where image capturing device 110 should move to capture an image to determine a location 140. In other embodiments, a second notification 210 may provide other messages such as advising a user 130 that the image is too dark and to use a flash. In other embodiments the second notification 210 may advise a user 130 to capture a picture of a sign or text located on a wall.

In operation 390, in one example, image capturing device 110 indicates that image capturing device 110 has captured a sufficient amount of images to determine a location 140. In one embodiment the location is shown on image capturing device 110. In one embodiment, image capturing device 110 automatically stops capturing images. In another embodiment, image capturing device 110 may be shut off manually.

Figure 4:
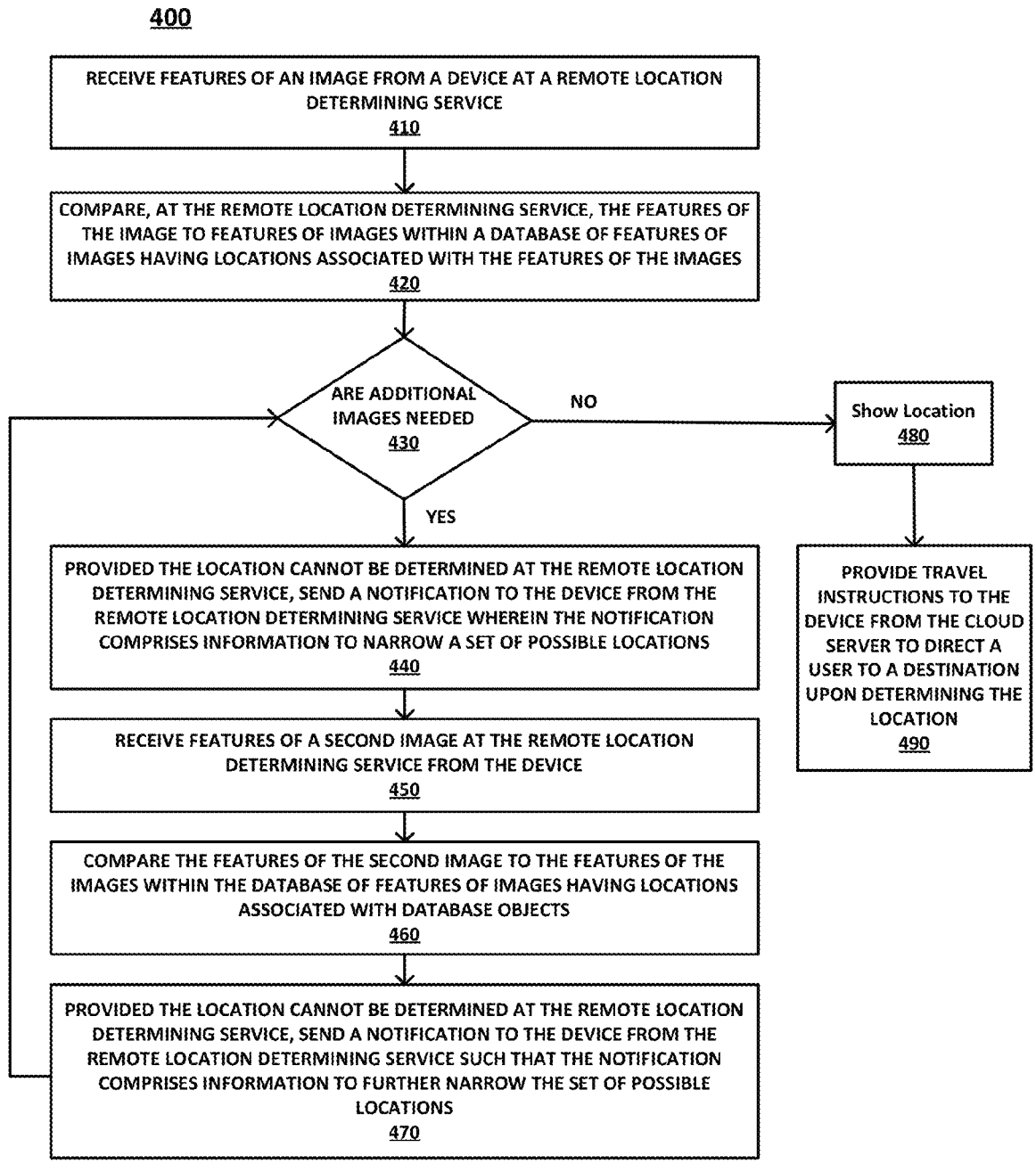
FIG. 4 is an example flowchart for providing a location to a device in accordance with embodiments of the present invention.

FIG. 4 is a flow diagram 400 of an example method of providing a location to a device.

In operation 410, in one example, an image, or features of the image, is received from a remote location determining service. In some embodiments the remote location determining service may receive the image wirelessly, while in other embodiments the remote location determining service may be wired. In some embodiments, although not all, remote location determining service is synonymous with cloud server 150. In some embodiments images are sent directly from an image capturing device 110, while in other embodiments images may be sent from a device which does not capture images such as a computer or an electronic hand held device which does not capture images.

In operation 420, in one example, the received image is compared at remote location determining service to a database of images having locations 140 associated with them. For example, cloud server 150 may receive an image from a device then compare the received image to images located within a database of images. Images may be compared using a variety of techniques as discussed herein.

In operation 430, in one example, a notification 210 is sent indicating whether additional images are required. If additional images are required, a notification 210 may indicate to user 130 that additional images are required and in some embodiments may advise user 130 on where to capture additional images.

In operation 440, in one example, provided the location 140 cannot be determined at cloud server 150, a notification 210 is sent to the device from the remote location determining service wherein the notification 210 comprises information to narrow a set of possible locations. For example, a notification 210 may advise a user 130 of a location on an approximate map where user 130 should capture another image. In another example, the notification 210 may comprise instructions on which direction user 130 should face when capturing another image with a device such as image capturing device 110.

In operation 450, in one example, a second image, or features of the second image, is received at the remote location determining service from the device. In some embodiments the remote location determining service/cloud server 150 may receive the image wirelessly, while in other embodiments the remote location determining service may be wired.

In some embodiments images are sent directly from an image capturing device 110, while in other embodiments images may be sent from a device which does not capture images such as a computer or an electronic hand held device which does not capture images.

In operation 460, in one example, the second image is compared to the images within the database having locations associated with the images. For example, cloud server 150 may receive an image from a device then compare the received image to images located within a database of images. Images may be compared using a variety of techniques as discussed herein.

In operation 470, in one example, provided the location cannot be determined at the remote location determining service, sending a notification to the device from the remote location determining service wherein the notification comprises information to further narrow the set of possible locations. For example, a notification 210 may advise a user 130 of a location on an approximate map where user 130 should capture another image. In another example, the notification 210 may comprise instructions on which direction user 130 should face when capturing another image with a device such as image capturing device 110.

In operation 480, in one example, location 140 is shown to user 130. In one example, a notification 210 is sent indicating that no additional images are required. For example, if cloud server 150 has determined the location 140 of the device, cloud server 150 may send a notification 210 advising user 130 that it has determined location 140 and that no additional images are needed to determine location 140.

In operation 490, in one example, travel instructions are provided to the device from the cloud server 150 to direct a user 130 to a destination upon determining a location 140. For example, if a destination is known by cloud server 150 and a location 140 is determined, cloud server 150 may compute the directions from location 140 to the desired destination. Cloud server 150 then sends these directions to the device.

Figure 5:
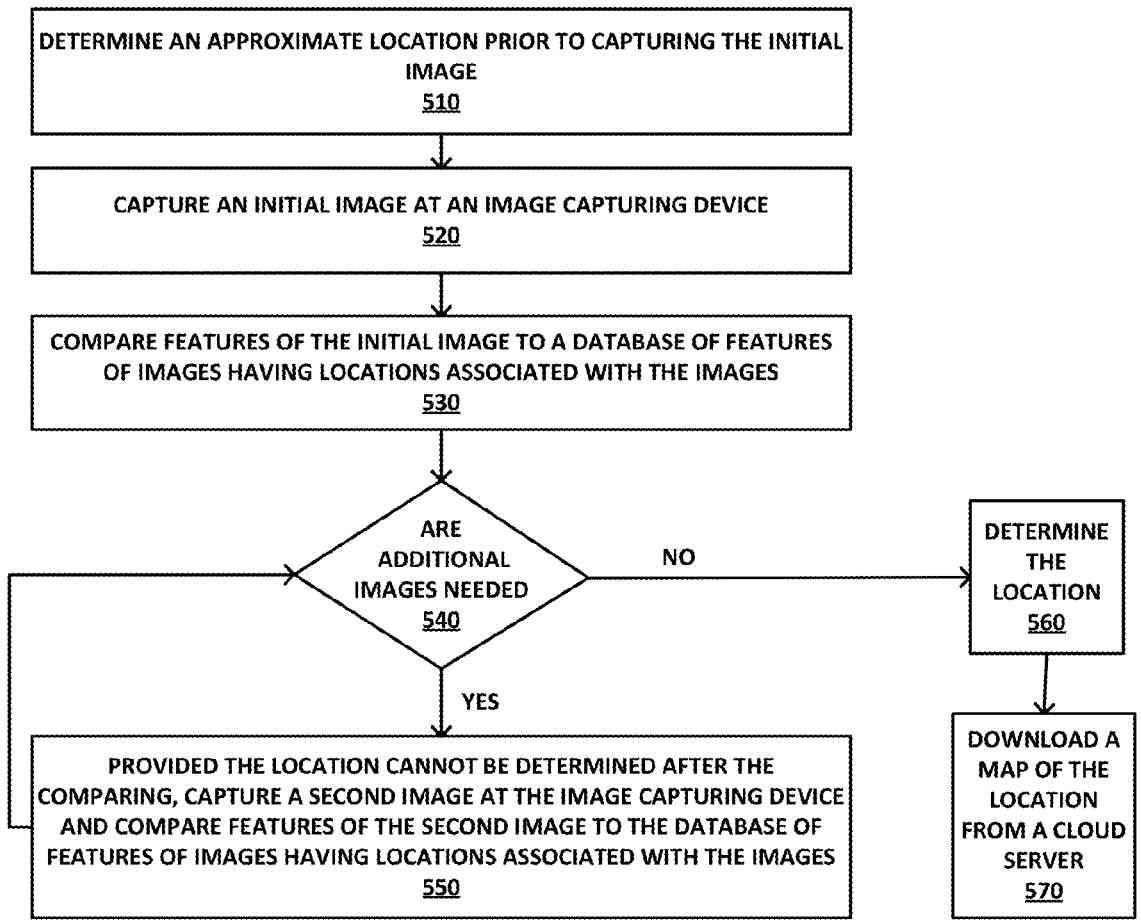
FIG. 5 is an example flowchart for determining a location with an image capturing device in accordance with embodiments of the present invention.

FIG. 5 is a flow diagram 500 of an example method of determining a location with an image capturing device.

In operation 510, in one example, an approximate location is determined prior to capturing the initial image. As discussed herein, in some embodiments an approximate location is determined to reduce the amount of images to be compared with the captured image. The approximate location may be a map of a mall, an area of a park, an area of a city, or a map of an office building or complex.

In operation 520, in one example, an initial image is captured at an image capturing device 110. As discussed above, in some embodiments the initial image may be a still image or a video. As examples, the initial image may be of the interior of a building, a sign above a building, the exterior of a building, a landscape, a cityscape, etc.

In operation 530, in one example, the initial image is compared to a database of images having locations 140 associated with the images. In one embodiment, the initial image is sent to a cloud server 150. In another embodiment, the initial image is not sent to a cloud server 150, but rather compared to images within a database located in image capturing device 110. For example, a map or database comprising images which are contained in the area the map represents may be present in image capturing device 110, such as in its memory or on a removable disk. In some embodiments, the comparison between an initial image, and images with locations associated with them may take place within image capturing device 110. In some embodiments, the database of images with locations associated with them may be downloaded to image capturing device 110 prior to capturing an image. In other embodiments, the database of images with locations associated with the images may be stored in the memory of the image capturing device 110.

In operation 540, in one example, image capturing device 110 notifies a user 130 that additional images are required. If additional images are required, a notification 210 may indicate to user 130 that more images are required and in some embodiments may advise user 130 on where to capture additional images.

In operation 550, in one example, provided the location cannot be determined after the comparing, a second image is captured at the image capturing device 110 and the second image is compared to the database of images having locations associated with the images. As described above, if after comparing an initial image to images located in the database a location cannot be determined, a second image is captured at the image capturing device 110. In some embodiments, if a location cannot be determined using a second image, a third image may need to be captured, and so on. In some embodiments, the image capturing device 110 captures additional images automatically, while in other embodiments a user 130 is prompted to capture additional images.

In operation 560, in one example, the location 140 is determined. If a captured image matches an image within a database, a notification 210 may indicate to a user 130 that location 140 is determined. In some embodiments, this may cause the image capturing device 110 to calculate directions to a desired destination. In some embodiments, the image capturing device 110 may provide a user 130 with a probability of whether the location 140 has been determined (e.g., a 95% chance that the location 140 is the actual location where image capturing device 110 is located).

In operation 570, in one example, a map of location 140 is downloaded from a cloud server 150. In some embodiments, once location 140 is determined, a map of location 140 and the area surrounding it may be downloaded from a cloud server 150. User 130 may use this map to navigate the area in which they are currently located.

In operation 580, in one example, image capturing device 110 notifies a user 130 that no additional images are required. In some embodiments, when user 130 receives this notification 210 either location 140 has been determined or the image capturing device 110 in conjunction with the database of images has determined that it cannot determine the location 140 given the set of images provided.

Figure 6:
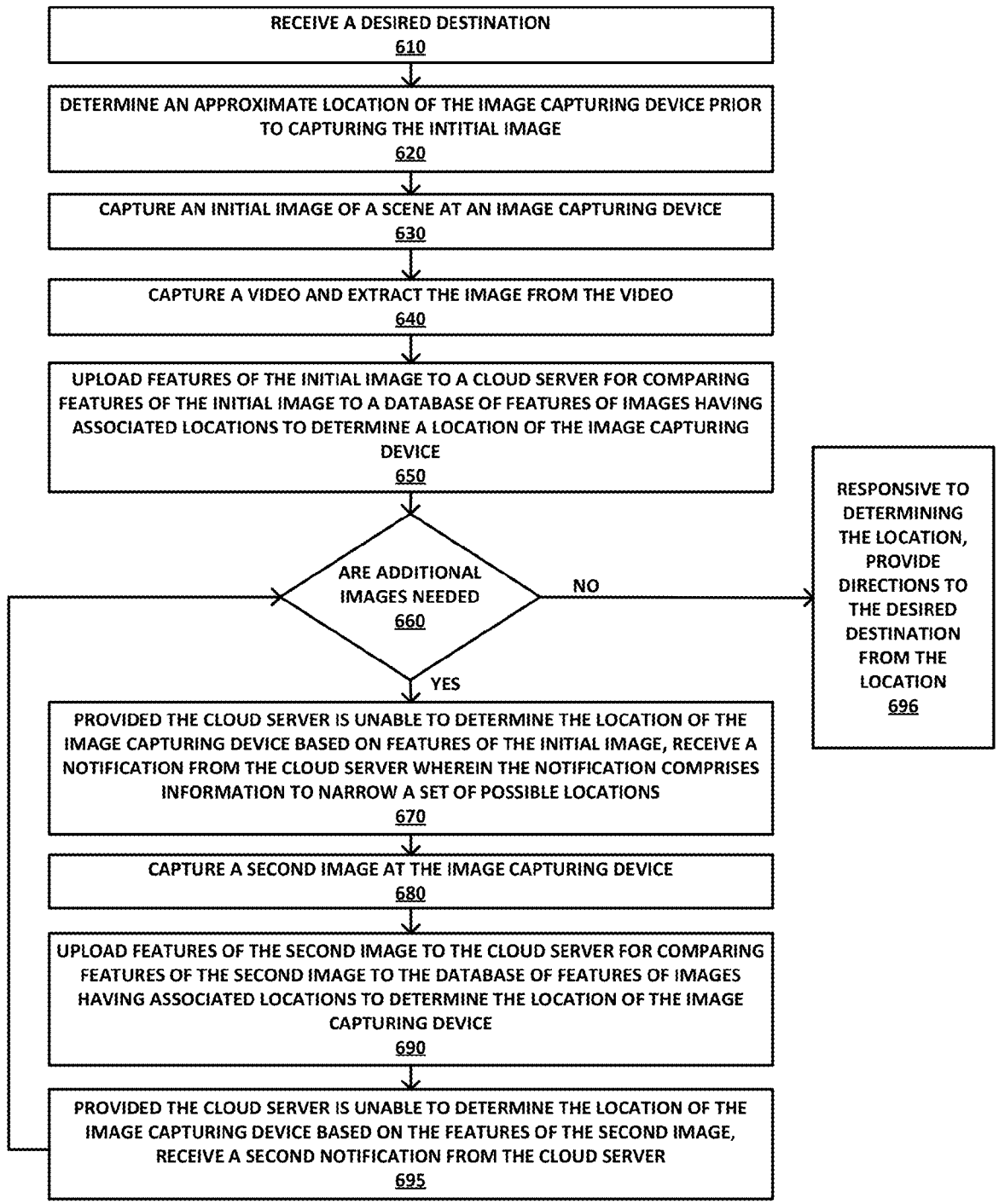
FIG. 6 is an example flowchart for determining a location and providing directions with an image capturing device in accordance with embodiments of the present invention.

FIG. 6 is a flow diagram 600 of an example method for determining a location and providing directions with an image capturing device.

In operation 610, in one example, a desired destination is received. As an example, a user 130 may input a desired destination into image capturing device 110. User 130 will attempt to use image capturing device 110 to determine its current location 140, after which image capturing device 110 may provide user 130 with a map displaying the distance between location 140 and the desired location.

In operation 620, in one example, an approximate location of the image capturing device 110 is determined prior to capturing the initial image. By determining an approximate location prior to capturing an image, the number of images to compare to the captured image may become much smaller, thereby reducing latency. An approximate location may be determined using a global positioning system, triangulation, wi-fi inferment, etc.

In operation 630 an initial image of a scene is captured with an image capturing device 110. In some examples the scene may be the interior of a building, in others it may be an exterior of a building or a landscape. In some examples image capturing device 110 captures video and extracts images from the video, in other examples image capturing device 110 captures still images.

In operation 640, in one example, a video is captured and an image is extracted from the video. As an example, image capturing device 110 may have the capability to capture video. In some examples all video may be sent to cloud server 150 for comparison to determine a location 140. As another example image capturing device 110 may extract images from video to send to cloud server 150 for comparison.

In operation 650, in one example, the initial image is uploaded to a cloud server 150 for comparing the initial image to a database of images having associated locations 140 to determine a location 140 of the image capturing device 110. For the purposes of this disclosure comparing an image to a database of images is synonymous with comparing an image to images located within a database of images. In some examples, cloud server 150 comprises images where each image has a location 140 associated with it. When the initial image is uploaded, it is compared to the images in the database to determine whether it matches an image in the database. If it matches, in some embodiments, a notification 210 is sent to image capturing device 110 to indicate to user 130 that they are at the particular location 140 associated with the image stored in the database. In some examples, only portions of the image are compared to portions of images stored in the database of images.

In operation 660, in one example, image capturing device 110 indicates whether additional images are required. If additional images are required, user 130 may gather additional images using image capturing device 110. For example, if a notification 210 advises user 130 that additional images are required, user 130 may capture additional images of his surrounding to determine the location 140 of image capturing device 110.

In operation 670, in one example, provided that cloud server 150 is unable to determine the location 140 of the image capturing device 110 based on the initial image, a notification 210 is received from cloud server 150 wherein the notification 210 comprises information to narrow a set of possible locations where image capturing device 110 could be located. For example, an initial image or even a second image may not match an image in the database of images. In that situation cloud server 150 may send a notification 210 to image capturing device 110 to indicate to user 130 that image capturing device 110 is in one of a subset of locations 140. This subset may be large or small, and may include the names of specific locations or geographic coordinates. In some embodiments, the notification 210 may take the form of a map overlay, a split screen display, augmented reality, or sound.

In operation 680, in one example, a second image is captured at the image capturing device 110. The image capturing device 110 may capture the image automatically, or prompt user 130 to capture a second image. In some embodiments if a second image is required image capturing device 110 will begin recording video automatically and begin uploading images extracted from the video to cloud server 150 to determine the location of image capturing device 110.

In operation 690, in one example, a second image is uploaded to cloud server 150 for comparing a second image to the database of images having associated locations 140 to determine the location 140 of the image capturing device 110. If a location 140 cannot be determined by an initial, or first image, a second image is captured to assist image capturing device 110 determine its location 140. In some embodiments, a comparison between an initial image and an image in a database may only provide an approximate match (e.g., a notification 210 may display that there is a 60% chance that user 130 is in a particular location). In that situation a second image may increase or decrease the probability that the approximate match is the correct location 140. In some embodiments, a notification 210 may advise user 130 of a direction in which to capture a second image.

In operation 695, in one example, provided the cloud server 150 is unable to determine the location of the image capturing device 110 based on the second image, a second notification 210 is received from cloud server 150. If after comparison, a location 140 still cannot be determined, another notification 210 is sent to image capturing device 110. In some embodiments the second notification 210 may advise user 130 on a direction in which to capture another image, or it may comprise directions on where image capturing device 110 should move to capture an image to determine a location 140. In other embodiments, a second notification 210 may provide other messages such as advising a user 130 that the image is too dark and to use a flash. In other embodiments the second notification 210 may advise a user 130 to capture a picture of a sign or text located on a wall.

In operation 696, in one example, directions are provided to the desired destination from location 140 in response to determining location 140. In one embodiment, image capturing device 110 may provide directions from location 140 to the desired destination. In some embodiments the directions may be in the form of a map, a map overlay, a list of written directions, or sound.

Figure 7:
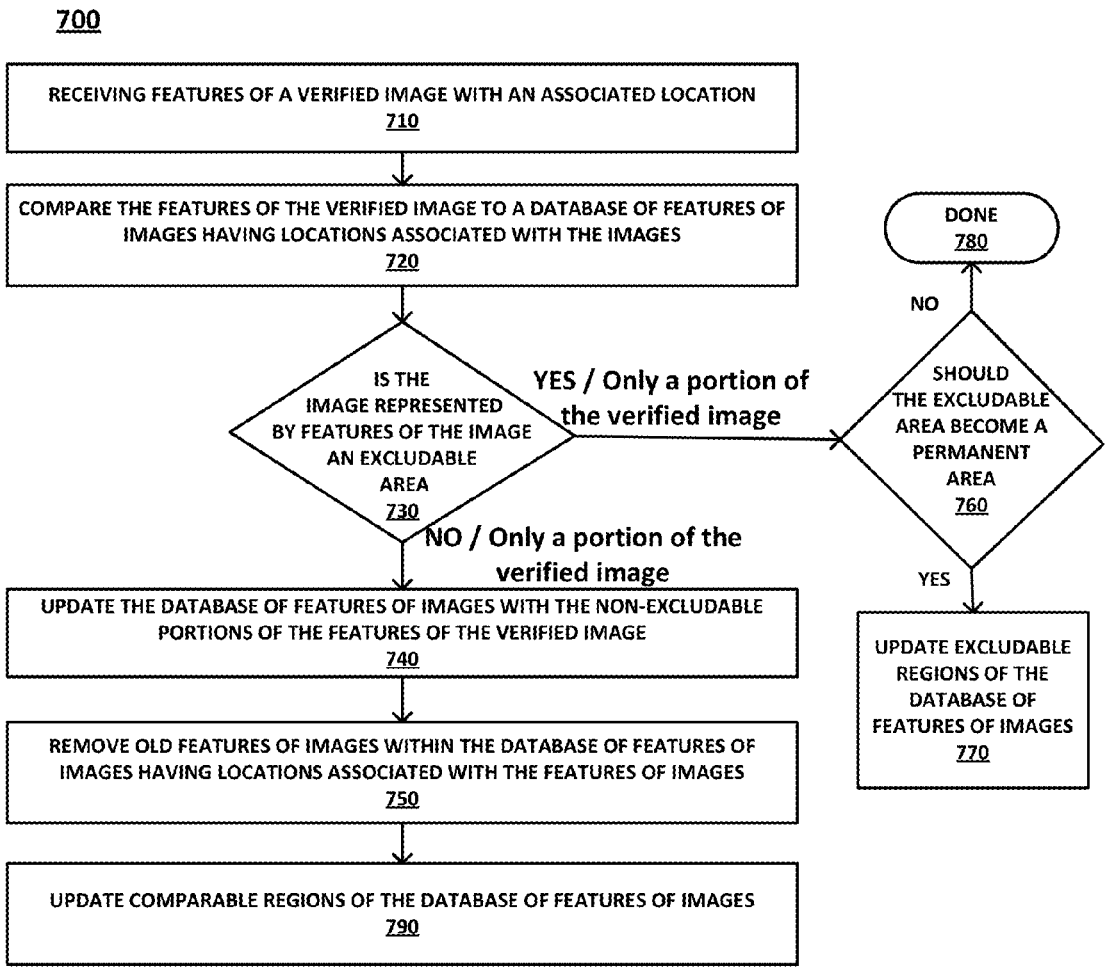
FIG. 7 is an example flowchart for determining when to update a database.

FIG. 7 is a flow diagram 700 of an example method for determining when to update a database.

In operation 710, in one example, a verified image with an associated location is received. In some embodiments, a verified image is an image with a verified associated location. Verifying images prevents updating a database with an incorrect image or at an incorrect location. As discussed above, the verified image may be a still image or an image extracted from a video stream.

In operation 720, in one example, the verified image is compared to a database of features of images having locations associated with the images. In some embodiments an image may be compared to a physical image within a database. In some embodiments an image may be compared with features of an image within a database. In some embodiments, features of an image may be compared with features of an image in a database.

In operation 730, in one example, a determination is made as to whether the image contains an excludable area 170. If the entire image is of an excludable area 170, the flow chart 700 skips ahead to operation 760. If the image does not contain an excludable area 170, the flow chart 700 moves to operation 740. In some embodiments, if a portion of an image is an excludable area 170, the portion of the image containing excludable area 170 may skip ahead to operation 760 while the portion of the verified image not including excludable region 170 may continue to operation 740.

In operation 740, in one example, the database of features of images is updated with the verified image. This way, the database may provide more accurate results when performing comparisons in the future.

In operation 750, in one example, old features of images within a database of features of images having locations associated with the images are removed. In one example this may be performed at cloud server 150, while in other examples this may be performed elsewhere, In operation 760, in one example, a determination is made as to whether the excludable area 170 captured in the initial image ought to become a permanent/comparable area. As discussed above, since excludable areas frequently change they should not be compared when a comparison of images takes place. However, if the excludable area 170 has become a permanent/comparable area it should be reclassified. For example, if a white board is replaced with a piece of art, or if a construction site is replaced with a bridge, these typically excludable areas 170 may become permanent/comparable areas.

In operation 770, in one example, excludable areas are reclassified to a comparable area in a database of features of images. Now these images or features of images may be compared to images captured by image capturing device 110.

In operation 780, in one example, if it is determined that the excludable area 170 should not become a permanent/comparable area, the process of updating the database is finished.

In operation 790 comparable regions of the database of features are updated. In one embodiment, this is only performed if the update was not performed in step 740. This way, even if an excludable region 170 was part of an image or the features of an image, the comparable region of an image or the features of an image may still be used to update a database of features of images.

Example Electronic Environment

Figure 8:
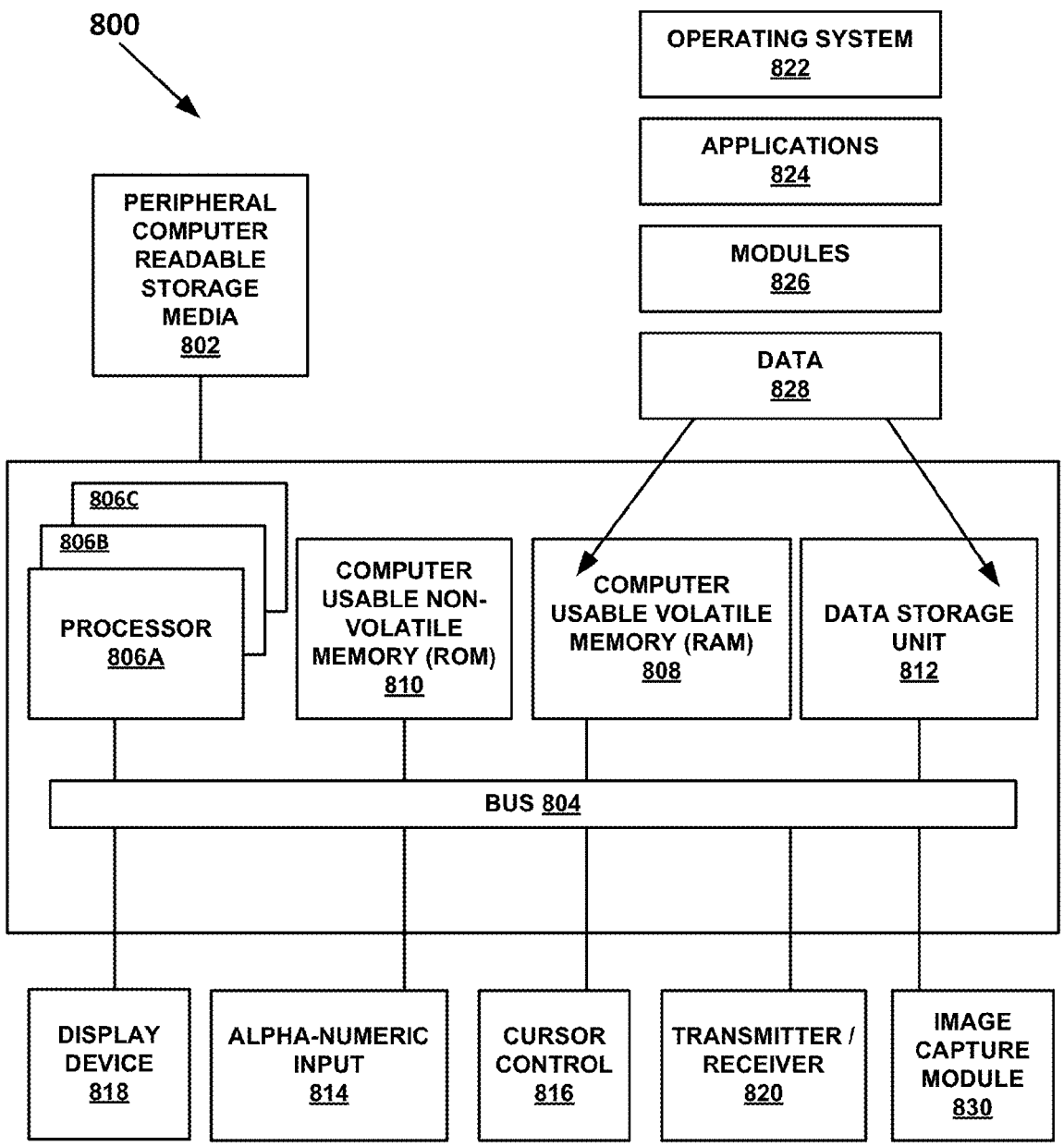
FIG. 8 is a block diagram of an example system used in accordance with one embodiment of the present invention.

With reference now to FIG. 8, all or portions of some embodiments described herein are composed of computer-readable and computer-executable instructions that reside, for example, in computer-usable/computer-readable storage media of image capturing device 110. That is, FIG. 8 illustrates one example of a type of image capturing device 110 that can be used in accordance with or to implement various embodiments which are discussed herein. It is appreciated that image capturing device 110 as shown in FIG. 8 is only an example and that embodiments as described herein can operate in conjunction with a number of different computer systems including, but not limited to: general purpose networked computer systems, embedded computer systems, routers, switches, server devices, client devices, various intermediate devices/nodes, stand alone computer systems, media centers, handheld computer systems, multi-media devices, and the like. Image capturing device 110 is well adapted to having peripheral tangible computer-readable storage media 802 such as, for example, a floppy disk, a compact disk, digital versatile disk, other disk based storage, universal serial bus "thumb" drive, removable memory card, and the like coupled thereto. The tangible computer-readable storage media is non-transitory in nature.

Image capturing device 110, in one embodiment, includes an address/data bus 804 for communicating information, and a processor 806A coupled with bus 804 for processing information and instructions. As depicted in FIG. 8 image capturing device 110 is also well suited to a multi-processor environment in which a plurality of processors 806A, 806B, and 806C are present. Conversely, image capturing device 110 is also well suited to having a single processor such as, for example, processor 806A. Processors 806A, 806B, and 806C may be any of various types of microprocessors. Image capturing device 110 also includes data storage features such as a computer usable volatile memory 808, e.g., random access memory (RAM), coupled with bus 804 for storing information and instructions for processors 806A, 806B, and 806C. Image capturing device 110 also includes computer usable non-volatile memory 810, e.g., read only memory (ROM), coupled with bus 804 for storing static information and instructions for processors 806A, 806B, and 806C. Also present in image capturing device 110 is a data storage unit 812 (e.g., a magnetic or optical disk and disk drive) coupled with bus 804 for storing information and instructions. Image capturing device 110 may also include an alphanumeric input device 814 including alphanumeric and function keys coupled with bus 804 for communicating information and command selections to processor 806A or processors 806A, 806B, and 806C. Image capturing device 110 may also include a cursor control device 816 coupled with bus 804 for communicating user 130 input information and command selections to processor 806A or processors 806A, 806B, and 806C. In one embodiment, image capturing device 110 may also include a display device 818 coupled with bus 804 for displaying information.

Referring still to FIG. 8, in one embodiment display device 818 of FIG. 8 may be a liquid crystal device, light emitting diode device, cathode ray tube, plasma display device or other display device suitable for creating graphic images and alphanumeric characters recognizable to user 130. In one embodiment, cursor control device 816 allows user 130 to dynamically signal the movement of a visible symbol (cursor) on a display screen of display device 818 and indicate user 130 selections of selectable items displayed on display device 818. Many implementations of cursor control service 816 are known in the art including a trackball, mouse, touch pad, joystick or special keys on alphanumeric input device 814 capable of signaling movement of a given direction or manner of displacement. Alternatively, it will be appreciated that a cursor can be directed and/or activated via input from alphanumeric input device 814 using special keys and key sequence commands. Image capturing device 110 is also well suited to having a cursor directed by other means such as, for example, voice commands. Image capturing device 110 also includes a transmitter/receiver 820 for coupling image capturing device 110 with external entities such as cloud server 150. For example, in one embodiment, transmitter/receiver 820 is a wireless card or chip for enabling wireless communications between image capturing device 110 and network 120 and/or cloud server 150. As discussed herein, image capturing device 110 may include other input/output devices not shown in FIG. 8. For example, in one embodiment image capturing device 110 includes a microphone. In one embodiment, image capturing device 110 includes an image capture module 830 used for capturing image data. In some embodiments, image capture module 830 may capture video and/or extract an image from a video.

Referring still to FIG. 8, various other components are depicted for image capturing device 110. Specifically, when present, an operating system 822, applications 824, modules 826, and data 828 are shown as typically residing in one or some combination of computer usable volatile memory 808 (e.g., RAM), computer usable non-volatile memory 810 (e.g., ROM), and data storage unit 812. In some embodiments, all or portions of various embodiments described herein are stored, for example, as an application 824 and/or module 826 in memory locations within computer usable volatile memory 808, computer-readable storage media within data storage unit 812, peripheral computer-readable storage media 802, and/or other tangible computer-readable storage media.

Embodiments of the present technology are thus described. While the present technology has been described in particular embodiments, it should be appreciated that the present technology should not be construed as limited by such embodiments, but rather construed according to the following claims.

What is claimed is:

1. A method for determining a location, said method comprising:
    capturing an initial image of a scene at an image capturing device;

uploading features of said initial image to a cloud server for comparing said features of said initial image to a database of features of images having associated locations to determine a location of said image capturing device; and provided said cloud server is unable to determine said location of said image capturing device based on said features of said initial image, receiving a notification from said cloud server wherein said notification comprises information to narrow a set of possible locations, wherein said notification comprises instructions for capturing a second image and indicating a second direction to capture said second image, wherein said instructions for capturing said second image comprises indicating an area to capture said second image, wherein said second image assists in determining said location, wherein said second direction dictates where said image capturing device should be moved to capture said second image to determine said location of said image capturing device, wherein said second direction is determined at least in part by a remote location determining service associated with said cloud server, wherein said area to capture said second image is determined based at least in part on said remote location determining service.

2. The method of claim 1 further comprising:
determining an approximate location of said image capturing device prior to capturing said initial image.

3. The method of claim 1 further comprising:
capturing said second image at said image capturing device; and
uploading features of said second image to said cloud server for comparing said features of said second image to said database of features of images having associated locations to determine said location of said image capturing device; and
provided said cloud server is unable to determine said location of said image capturing device based on said features of said second image, receiving a second notification from said cloud server.

4. The method of claim 1 further comprising:
receiving a desired destination; and
responsive to determining said location, providing directions to said desired destination from said location.

5. The method of claim 1 wherein said second image captured in said second direction refines a possible location of said image capturing device.

6. The method of claim 1 wherein said second direction is relative to a first direction in which said initial image was captured.

7. The method of claim 1 wherein said notification comprises a selectable list of possible locations.

8. A method for providing a location to a device comprising:
receiving features of an image from a device at a remote location determining service;
comparing, at said remote location determining service, said features of said image to features of images within a database of features of images having locations associated with said features of images; and
provided said location cannot be determined at said remote location determining service, sending a notification to said device from said remote location determining service wherein said notification comprises information to narrow a set of possible locations, wherein said notification comprises instructions for capturing a second image and indicating a second direction to capture said second image, wherein said instructions for capturing said second image comprises indicating an area to capture said second image, wherein said second image assists in determining said location, wherein said second direction dictates where said image capturing device should be moved to capture said second image to determine said location of said image capturing device, wherein said second direction is determined at least in part by a remote location determining service associated with a cloud server, wherein said area to capture said second image is determined based at least in part on said remote location determining service.

9. The method of claim 8 further comprising:
receiving features of said second image at said remote location determining service from said device;
comparing said features of said second image to said features of images within said database of features of images having locations associated with database objects; and
provided said location cannot be determined at said remote location determining service, sending a notification to said device from said remote location determining service wherein said notification comprises information to further narrow said set of possible locations.

10. The method of claim 8 further comprising:
providing travel instructions to said device from said remote location determining service to direct a user to a destination upon determining said location.

11. The method of claim 8 further comprising:
receiving features of a verified image with an associated location;
comparing said features of said verified image to said database of features of images having locations associated with said features of said images;
determining whether a region of said features of said verified image is excludable from comparison; and
updating said database of features of images having locations associated with said features of said images.

12. The method of claim 11 further comprising:
updating excludable regions of said database of features of images.

13. The method of claim 11 further comprising:
updating comparable regions of said database of features of images.

14. The method of claim 8 wherein said second image captured in said second direction refines a possible location of said image capturing device.

15. A method for determining a location, said method comprising:
capturing an initial image at an image capturing device;
comparing said initial image to a database of features of images having locations associated with said images;
provided said location cannot be determined after said comparing, capturing a second image at said image capturing device and comparing said second image to said database of features of images having locations associated with said images, wherein said second image is captured in a second direction indicated by a notification wherein said second direction dictates where said image capturing device should be moved to capture said second image to determine said location, wherein capturing said second image comprises indicating an area to capture said second image, wherein said second image assists in determining said location, wherein said second direction is determined at least in part by a remote location determining service associated with a cloud server, wherein said area to capture said second image is determined based at least in part on said remote location determining service; and determining said location.

16. The method of claim 15 further comprising:
determining an approximate location prior to capturing said initial image.

17. The method of claim 15 further comprising:
downloading a map of said location from a cloud server.

18. The method of claim 15 wherein said database is located on a cloud server.

\* \* \* \* \*